Patented Aug. 8, 1944

2,355,548

UNITED STATES PATENT OFFICE 2,355,548

SAUSAGE COMPOSITION

Sidney Musher, New York, N. Y., assignor to Musher Foundation Incorporated, New York, N. Y., a corporation of New York No Drawing. Application June 1, 1944, Serial No. 538,325

6 Claims. (Cl. 99—109)

The present invention relates to a sausage composition and particularly relates to a sausage which is stabilized against substantial loss of moisture and shriveling in the casing as well as to a sausage of high moisture content whereby the moisture is substantially retained over normal periods of storage and distribution.

In the art of sausage making it is the aim of the sausage maker to produce a product that will not only absorb a large amount of moisture in order to provide a moist sausage composition but also to produce a sausage in the casing which will be protected against shriveling and against the loss of its moisture over normal periods of storage and distribution.

Although powdered milk, starches and other cereals have been used in sausage, whatever water is absorbed by these products is not retained to the desired degree thereby producing a sausage which is subject to shriveling and loss of moisture content resulting in loss of weight and loss of revenue to the storekeeper or to the manufacturer selling the product.

An object of the present invention is therefore to provide an ingredient for sausage compositions which will supply at low cost desirable physical characteristics and which will also permit the sausage not only to absorb but also to retain a substantial proportion of water.

A further object is to provide a sausage composition which is substantially protected against shriveling and loss of moisture content over normal periods of storage and distribution.

Still further objects and advantages will appear from the more detailed description set forth below, it being understood, however, that this more detailed description is given by way of illustration and explanation only, and not by way of limitation since various changes therein may be made by those skilled in the art without departing from the scope and spirit of the present invention.

It has now been found that when a certain fraction of oats has been properly separated from the oat grain and finely divided it may be incorporated as an ingredient in a sausage composition to give such sausage composition unusual physical characteristics whereby the sausage will absorb and retain a high proportion of water and whereby the sausage in the casing will be protected against shriveling over normal periods of storage and distribution.

These stabilizing properties are not to be found in the oat grain as a whole or in ordinary oat products as, for example, in oat flour made by grinding oat groats or in pulverizing oats or oat hulls. These properties are only developed when a special fraction of the oat grain is removed from the balance of the oat grain.

This special oat fraction is a relatively low starch, relatively high protein fraction which may be obtained after removal of the cellulosic hulls of the oats and after removal of a large portion of the relatively high starch fraction.

This particular fraction of oats is best prepared by first milling the oats to remove the cellulosic hulls leaving the oat groats. This is desirably accomplished by drying the oats with their hulls to reduce the moisture content in order more readily to remove the hulls from the oats. These oat groats thus obtained are then specially processed to remove the relatively high starch fraction and to concentrate the relatively high protein fraction thereof, obtaining a fraction which contains desirably in excess of about 20% protein and most desirably in excess of 22% protein.

In treating these oat groats to obtain the special stabilizer desired the groats are pulverized desirably in an attrition mill to such an extent that at least 50% and desirably 80% to 90% will pass through a screen or mesh or bolting cloth having a fineness in excess of about 60 mesh and desirably having a fineness in excess of 70 mesh.

The oat groats are ground as indicated above and the ground groats are then separated as by aspirating or screening into two fractions, namely, a coarse fraction and a fine fraction, the coarse fraction comprising the minor fraction of less than 50% by weight and most desirably comprising 10% to 20% of the total weight of the ground oat groats and the fine fraction comprising over 50% and most desirably between 80% and 90% of the total weight of the ground oat groats.

It is the coarse residue which is left after such grinding and screening or bolting or after aspirating which is found to contain the properties most desirable for incorporation in sausage compositions and the gum and stabilizing effect is most particularly observed after the coarse fraction has all been ground to a fineness of at least 50 mesh and most desirably to at least 60 mesh.

This effect is not evident or evidenced when the whole oats are ground and utilized as such or when the oat flour made by grinding oat groats is utilized as such because of the fact that other constituents therein greatly lessen, diminish or render ineffective the unusual stabilizing or gummy properties of the ground, relatively high protein and relatively low starch containing dehulled oat fraction of the present invention.

In the preferred procedure the oat groats, after removal of the hulls by milling processes, are pulverized or ground and then by aspirating, bolting or screening, the relatively high starch containing oat fraction is removed. The pulverized oat groats may, for example, be aspirated to separate the minor fraction of the relatively low starch and relatively high protein containing materials. This process may where desired be continued by regrinding, rescreening or reaspirating until the relatively high starch material has been largely removed leaving the relatively high protein fraction behind desirably to be ground to at least 60 mesh for use in accordance with the procedures of the present invention.

The coarse fraction obtained will generally have a protein content in excess of 20% and more desirably in excess of 22%. At the same time the starch content of the coarse fraction will be reduced to much less than the starch content of the fine fraction. For example, the starch content of the coarse fraction will be at least about 5% to 10% less than the starch content of the fine fraction.

The fraction which is relatively high in starch and relatively low in protein and which is left after the preparation of this fraction used in the sausage composition will contain about 14% to 16% protein or less.

According to one preferred method of separating the relatively high starchy fraction which is necessary to obtain the stabilizing properties in most highly developed condition, the groats are ground or pulverized so that a major proportion thereof, say at least 50% to 80%, will have a fineness in excess of about 60 mesh and desirably at least 60% to 70% of the ground material will have a sufficient fineness to go through about a 90 mesh screen.

Then the pulverized material is screened, preferably by aspirating or placing through a fine silk screen to remove all particles which will not go through about a 60 mesh screen.

A most highly desirable method is to grind the oat groats until over 75%, and desirably between 80% and 90% will go through a 70 mesh screen but wherein the balance of between 10% and 20% remains on the screen. Then the pulverized groats are aspirated or screened to remove all the coarse particles and to separate the fine fraction comprising 80% to 90% from the coarse fraction comprising the balance of 10% to 20% which coarse fraction is used in accordance with the procedures of the present invention.

The oat material which goes through the screen or the fine material which is aspirated will contain the relatively high starch fraction whereas the material left behind on the screen or the coarse fraction thereof will be relatively low in starch content.

This coarse, relatively low starch and relatively high protein material is then finely divided and may then be used in accordance with the procedures of the present invention, the unusual stabilizing properties now being present with the removal of the cellulosic hulls and the relatively high starch fraction of the oat groats.

These coarser particles in which the stabilizing properties are concentrated are most desirably ground or pulverized such as in a hammer or stone or attrition mill to a particle size of at least 50 mesh and more desirably so that all of the coarse particles will go through at least a 60 mesh screen. This may be accomplished by first pulverizing the coarse particles and separating that fraction which will go through a 60 or more mesh screen followed by regrinding the remaining coarse portion and continuing the grinding and separating until all of the coarse fraction has been ground to a point where the entire coarse fraction will go through at least a 60 mesh screen.

The stabilizing action given by this particular treatment of oats is given by neither the oat flour produced by grinding oat groats nor by starch.

Moreover, the product produced in accordance with the present invention has not been found replaceable by any other fraction of oats, or by and other type of cereal or its fractions, including wheat or its fractions, corn or its fractions, barley or its fractions, rye or its fractions, rice or its fractions, or other types of cereals which the applicant has carefully studied.

Although the chemical composition may vary it has been found that 20% protein should be present and most desirably 22% protein. Highly desirable materials have been made containing 25% to 29% protein.

It has been found possible, where desired to bleach this special oat fraction with chlorine or hypochlorite to lighten its color. It is also possible to to obtain this bleaching effect with reducing agents such as sulfites but these reducing agents are not as effective as the oxidizing bleaching agents.

By the term "dry milled oat product" as used in the present application and claims is meant an oat product which has been subjected to either grinding, screening, bolting, aspirating or combinations thereof or even to oil solvent extraction but wherein the oat product has been processed in the substantial absence of water.

The special oat fraction of the present invention is added to the sausage ingredients in an amount of between 0.5% and 10% by weight and preferably in an amount of between 2.5% and 3.5%. The meat which is used is desirably first chopped in the cutter or meat hasher and a sufficient quantity of water or ice is added so as to be fully absorbed by the meat. For example, when using a combination of beef trimmings and pork trimmings for the meat about 25% of water or ice may be added against the weight of the combination of pork trimmings and beef trimmings.

The finely divided special oat fraction of the present invention is then added and an additional quantity or water or ice is added until the emulsion or mixture takes on the desired viscosity. It has been observed that 1 pound of the finely divided special oat fraction of the present invention will absorb between 6 and 9 pounds of water which is an unusually high ratio of water and compares, for example, with dry milk solids absorbing 1.7 to 1.9 pounds of water per pound of dry milk solids or compares with about 3.5 to 4.0 pounds of water to each 1 pound of gelatinized wheat flour.

Where desired, the finely divided special oat fraction may first be combined with a small amount of water and then added to the meat chopper but it is preferable for the finely divided special oat fraction to be added in dry form and for the moisture to be added in the form of ice or where ice is not available, in the form of water at the lowest possible temperature such as at a temperature not more than about 40° F. to 50° F.

Spices and salt are generally included as part of the mixture and the entire combination of the meat, finely divided special oat fraction, water, salt and spices is thoroughly comminuted so as to form a substantially homogeneous mass of the sausage ingredients with the finely divided special oat fraction thoroughly distributed throughout the body of the sausage mass.

A wide variety of meat products may be used as the basis for the sausage. For example, beef products including flanks, loins, shanks, chucks, weasand meat, and various trimmings such as tongue trimmings, hearts and tripe, pork products including back bone trimmings, back fat trimmings, shoulder trimmings, belly trimmings, jowl trimmings, heart trimmings, cheek meat, head meat, etc., either fresh or sweet pickled may be used.

The meats used may be either fatty or lean and preferably lean meats are employed. The meat may be frozen, fresh, or desirably subjected to a curing operation such as by using a curing mixture consisting of about 7½ pounds of water and between 6 and 7 pounds of salt, sugar and spices to each 100 pounds of meat to be cured, holding the meat in the cure for a period varying from 12 hours in the case of ground meat to 15 or 20 days in the case of large pieces of meat and is best carried out at a temperature of around 35° F. to 40° F.

Among the spices that may be used are included pepper, allspice, garlic, coriander, nutmeg, mace or other spice ingredients and with or without salt-peter or sodium nitrate.

The finished mixture may then be incorporated in a casing using either the Visking type casing or natural casing such as bungs.

The subsequent steps of making and cooking described below are generally followed. However, the sausage may where desired be only smoked and the cooking may be omitted or where desired, the cooking may be conducted as the first step and the smoking as the second step as is done in some grades of sausage.

The sausage may then be smoked such as at a temperature of between 130° F. and 200° F. and desirably at a temperature of between about 140° F. and 160° F. for a period of time varying from 1 hour to 3 or more hours. As a result of the smoking operation, a certain amount of loss of weight of the sausage takes place but the loss of weight that occurs where the finely divided special oat fraction of the present invention is used is materially lessened so that from about 10% to 30% or more less shrinkage occurs during smoking when using the finely divided special oat fraction of the present invention as against where either no milk powder, starch, or other cereal is used or even where milk powder, starch or other cereal is employed.

The smoked sausage may then be cooked in a vat containing water such as at a temperature of between about 145° F. and 185° F. and desirably at a temperature between 160° F. and 165° F. for a period varying from ½ hour to several hours and desirably for a period of from 30 minutes to 1 hour.

The sausage may also be cooked by spraying it with hot water sprays as, for example, by applying a continuous spray of water at a temperature of about 170° F. to 190° F. After the cooking the sausage may have applied to it a cold water spray and may then be dried to remove the surplus water.

After the sausage processing has been completed it generally requires up to about 10 days to 2 weeks until the sausage goes into final consumption. Since sausage is sold by weight, any loss or shrinkage involves a loss of revenue to the sausage manufacturer or distributor.

By using the finely divided special oat fraction of the present invention not only can an additional amount of water be included in the manufacture of the sausage but in addition the moisture that is added is retained to a much greater degree than heretofore.

For example, sausage prepared with 3.5% of the finely divided special oat fraction of the present invention will result in the sausage weighing between 2% and 5% more after a 10 day period thereby producing a higher yield for the sausage manufacturer and distributor.

Of even greater importance is the fact that the appearance of the sausage after the 10 day period is far better, the sausage casing being especially free of wrinkling or shriveling as normally takes place where other ingredients are employed or where an all meat sausage is manufactured, and the sausage prepared with the finely divided special oat fraction of the present invention will still have its original desirable body and texture characteristics and will not look like a sausage that is dried up and which has been in storage for a period of months.

Where fatty meats are used in the manufacture of the sausage such as where excess quantities of fat pork products are employed, the incorporation of a relatively small amount of the finely divided special oat fraction will protect the fat against leaking out of the sausage and forming an undesirable film on the outer surface of the casing, thus overcoming the greasy appearance of the sausage.

By the term "sausage" there are included such sausage compositions as bologna, frankfurters, domestic sausage, pork sausage, the so-called "summer sausage" or dry sausage and sausage specialties such as meat loaves, jellied meats, liver flavored sausage, chili con carne and head cheese. There are also included braunschweiger sausage, blood sausage, Polish style sausage which is generally made by high seasoning with garlic, country style sausage, and bockwurst.

A combination may also be prepared comprising about 1 part of the finely divided special oat fraction and 1 to 4 parts of a sugar and 2 to 5 parts of water, milk or skim milk followed by heating the combination to over about 180° F. and then adding this mixture to the sausage ingredients.

For example, the finely divided special oat fraction may be added in a small amount of less than about 10% by weight to a sugar solution preferably containing more than 25% total sugar, whether the sugar be sucrose, dextrose, corn syrup or similar sugar, followed by heating to an elevated temperature in excess of 180° F. and desirably to temperatures of between 205° F. and 225° F.

For example, 1 to 5 parts of the finely divided special oat fraction may be added to a sugar solution comprising between 25% and 65% of a sugar and between 35% and 75% of water followed by heating to an elevated temperature of over about 180° F. Under these conditions a highly plastic mass and composition of unusual plasticity and viscosity is obtained. This combination may then be added to the sausage ingredients, compensating for the sugar in the plastic mass and so that the amount of the finely divided special oat fraction added will be within the range of the percentages provided for in the present application.

The fat, and desirably at least 75% of the faty, may also be extracted from the finely divided special oat fraction of the present invention such as by treatment of the special oat fraction or of the finely divided special oat fraction with a fat solvent. Among the fat solvents that are desirably used are included the volatile hydrocarbon solvents such as benzine, hexane, N-pentane, etc., as well as acetone which has been found highly satisfactory. There may also be very desirably used the low molecular weight aliphatic alcohols, particularly isopropyl alcohol but including also methanol, ethanol or propanol.

Among the other solvents that may be employed are carbon tetrachloride, carbon disulphide, dichlorethylene, trichlorethylene, dichlorethylether or similar fat solvents or combinations of any of the above may also be employed. Other fat soluble solvents may also be utilized and it is desirable for a maximum amount of the fat to be removed as would be done in any normal commercial procedure.

It is considered preferable to extract the special coarse oat fraction prepared in the manner indicated above although the coarser particles may first be ground before subjecting to fat extraction. The extracted product is very readily pulverized to the desired point of at least about 75 mesh and desirably to about 90 mesh.

By the term "total protein" is meant the total amount of protein present in the special oat fraction of the present invention.

By the term "finely divided" as used in connection with the special oat fraction of the present invention and claims is meant the oat fraction which has been subdivided to a state of fineness that will enable it to go through at least about a 50 mesh screen.

The present application is a continuation in part of applications, Serial No. 534,163 filed May 4, 1944, entitled Food composition, Serial No. 510,831 filed November 17, 1943, entitled oat product, and through the said latter application continues the subject matter of application, Serial No. 401,967 filed July 11, 1941 entitled Water thickening agent.

Having described my invention, what I claim is:

1. A sausage composition comprising as an ingredient a small amount of a finely divided, dry milled oat product, said oat product containing in excess of about 20% total protein and said oat product having a relatively low starch and a relatively high protein content as compared to dehulled oats.

2. A sausage composition comprising as an ingredient a small amount of less than 10% of a dry milled oat product having a fineness of at least about 60 mesh, said oat product containing in excess of about 20% total protein and said oat product having a relatively low starch and a relatively high protein content as compared to dehulled oats.

3. A sausage composition comprising as an ingredient a small amount of less than 10% of the coarse fraction of dehulled oats, said fraction having a fineness of at least about 60 mesh, said fraction containing in excess of about 22% total protein, said fraction being free of those particles which will go through a 60 mesh screen when the dehulled oats are pulverized to a fineness that will permit about 80% to 90% thereof to pass through a 60 mesh screen.

4. A sausage composition comprising as an ingredient 3.5% of the finely divided coarse fraction of dehulled oats, said fraction containing in excess of about 22% total protein, said fraction being free of these particles which will go through a 60 mesh screen when the dehulled oats are pulverized to a fineness that will permit about 80% to 90% thereof to pass through a 60 mesh screen.

5. A sausage composition comprising as an ingredient a small amount of less than 10% of the finely divided coarse fraction of dehulled oats, said finely divided coarse fraction being substantially free of those particles which will go through a 60 mesh screen when the dehulled oats are pulverized to a fineness that will permit a major proportion thereof to pass through a 60 mesh screen.

6. A sausage composition comprising as an ingredient about 3.5% of the finely divided coarse fraction of dehulled oats, said finely divided coarse fraction being substantially free of those particles which will go through a 60 mesh screen when the dehulled oats are pulverized to a fineness that will permit about 80% to 90 thereof to pass through a 60 mesh screen.

SIDNEY MUSHER.